(12) United States Patent
Lee et al.

(10) Patent No.: US 7,349,370 B2
(45) Date of Patent: Mar. 25, 2008

(54) METHOD FOR MANAGING NEIGHBOR NODES AND SETTING A ROUTING PATH IN A MOBILE AD-HOC NETWORK ENVIRONMENT AND NETWORK APPARATUS USING THE SAME

(75) Inventors: Keun-jae Lee, Seoul (KR); Song-yean Cho, Seoul (KR); Byung-in Mun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 82 days.

(21) Appl. No.: 11/291,893

(22) Filed: Dec. 2, 2005

(65) Prior Publication Data

US 2006/0126514 A1     Jun. 15, 2006

(30) Foreign Application Priority Data

Dec. 11, 2004   (KR) ................. 10-2004-0104590

(51) Int. Cl.
*H04Q 7/00* (2006.01)

(52) U.S. Cl. .............. 370/328; 370/238; 370/255; 370/216; 370/252; 370/351; 370/395.2; 709/241; 709/238; 455/67.11; 455/67.13; 455/63.1

(58) Field of Classification Search ............. 370/328, 370/238, 255, 216, 252, 351, 395.2
See application file for complete search history.

(56) References Cited

U.S. PATENT DOCUMENTS

| | | | |
|---|---|---|---|
| 5,521,910 A * | 5/1996 | Matthews | 370/256 |
| 6,704,301 B2 * | 3/2004 | Chari et al. | 370/351 |
| 6,718,394 B2 * | 4/2004 | Cain | 709/242 |
| 6,836,463 B2 * | 12/2004 | Garcia-Luna-Aceves et al. | 370/238 |
| 6,870,846 B2 * | 3/2005 | Cain | 370/392 |
| 6,894,985 B2 * | 5/2005 | Billhartz | 370/252 |
| 6,907,257 B1 * | 6/2005 | Mizutani et al. | 455/464 |
| 6,940,832 B2 * | 9/2005 | Saadawi et al. | 370/328 |
| 6,961,310 B2 * | 11/2005 | Cain | 370/238 |
| 6,973,039 B2 * | 12/2005 | Redi et al. | 370/238 |
| 6,980,566 B2 * | 12/2005 | Melick et al. | 370/471 |
| 7,007,102 B2 * | 2/2006 | Billhartz et al. | 709/238 |
| 7,023,818 B1 * | 4/2006 | Elliott | 370/328 |
| 7,068,600 B2 * | 6/2006 | Cain | 370/230.1 |
| 7,079,509 B2 * | 7/2006 | Belcea | 370/330 |
| 7,111,074 B2 * | 9/2006 | Basturk | 709/241 |

(Continued)

FOREIGN PATENT DOCUMENTS

JP     2001-274815 A    10/2001

(Continued)

*Primary Examiner*—Marceau Milord
(74) *Attorney, Agent, or Firm*—Sughrue Mion, PLLC

(57) ABSTRACT

A method and network apparatus for setting a routing path and managing a neighbor node in mobile ad hoc, network environment are provided. The method for setting a routing path in mobile ad hoc network environment includes receiving a packet periodically broadcast from a neighbor node, measuring the quality of a link with the neighbor node through the received packet, calculating routing paths using the routing information of the neighbor node when the measured link quality is higher than a first threshold value, and selecting the shortest routing path to a destination node, among the calculated routing paths, as a path for packet transmission.

11 Claims, 8 Drawing Sheets

U.S. PATENT DOCUMENTS

| | | | |
|---|---|---|---|
| 7,113,519 B2 * | 9/2006 | Hammel et al. | 370/458 |
| 7,149,183 B2 * | 12/2006 | Hammel et al. | 370/229 |
| 7,159,035 B2 * | 1/2007 | Garcia-Luna-Aceves et al. | 709/241 |
| 7,194,010 B2 * | 3/2007 | Beasley et al. | 370/503 |

FOREIGN PATENT DOCUMENTS

| | | |
|---|---|---|
| JP | 2003-218886 A | 7/2003 |
| JP | 2004-088657 A | 3/2004 |
| KR | 10-2004-0013744 A | 2/2004 |

\* cited by examiner

METHOD FOR MANAGING NEIGHBOR NODES AND SETTING A ROUTING PATH IN A MOBILE AD-HOC NETWORK ENVIRONMENT AND NETWORK APPARATUS USING THE SAME

CROSS-REFERENCE TO RELATED APPLICATION

This application claims priority from Korean Patent Application No. 10-2004-0104590 filed on Dec. 11, 2004 in the Korean Intellectual Property Office, the disclosure of which is incorporated herein in its entirety by reference.

BACKGROUND OF THE INVENTION

1. Field of the Invention

Apparatuses and methods consistent with the present invention relate to managing neighbor nodes and setting a routing path. More particularly, the present invention relates to a method and an apparatus for setting a routing path based on a stable network topology formed by using routing information of neighbor nodes having a higher level of link quality in a mobile ad hoc network environment.

2. Description of the Related Art

A mobile ad hoc network (hereinafter referred to as "MANET") is formed with portable network devices (hereinafter referred to as "nodes") such as notebooks, PDAs, or other portable network devices known in the art interconnected through wireless links not based on infrastructure.

In a MANET, the network topology changes regularly due to the mobility of nodes forming the network. A method for monitoring the changes in the network topology is to have each node forming the MANET periodically broadcast a control packet including its own routing information. An example of the control packet is a hello packet, which is mainly used in proactive mechanisms which are the routing protocol for MANET.

If the network topology is known based on the routing information of the control packet broadcast from neighbor nodes, each node can set a routing path through which a data packet to be transmitted by the node will pass. An operation to set a routing path will be explained with reference to FIG. 1.

FIG. 1 illustrates a MANET network topology according to the conventional art.

The MANET network topology and operation for setting a routing path in conventional art will be explained based on an example node A. Node A receives control packets from neighbor nodes (nodes B, C, and D) that are within a 1 hop region 130, whereby the node A senses the existence of the neighbor nodes. When the neighbor nodes are sensed, node A registers the neighbor nodes that transmitted the control packets in a neighbor table. Node identifiers to identify neighbor nodes and link information to indicate links with neighbor nodes are registered in the neighbor table. When no control packet is received from a neighbor node registered in the neighbor table for a certain period, the entry of the concerned neighbor node is deleted from the neighbor table.

Node A ascertains the network topology by using routing information of neighbor nodes registered in the neighbor table. As shown in FIG. 1, lines interconnecting nodes imply that the nodes are directly interconnected through a wireless link.

If the network topology is known, node A calculates a routing path, which can be used when transmitting a data packet to a destination node. For example, when node A transmits a data packet to a node F, a first path 110 involving a node B and a node E, or a second path 120 involving a node C may be set.

When the data packet is transmitted through the first path 110, the data packet has to pass through more nodes than when it is transmitted through the second path 120. The greater number of nodes in the first path implies that more network resources are consumed when the first path 110 is used to transmit the data packet than when the second path 120 is used to transmit the same data packet. Thus, according to the MANET network topology operation for setting a routing path in the conventional art, the second path 120 is set as a routing path in order to minimize the traveling path of the data packet.

As described above, in the conventional art, a routing path is set so that a traveling path of the data packet can be minimized to thereby efficiently use limited wireless network resources. However, since the conventional art operation does not consider the link quality of nodes, network resources may be wasted.

Because MANET uses a wireless medium in order to transmit a data packet, the transmission success of the data packet depends upon the link quality at the time of data packet transmission. Because of the inherent properties of the wireless medium, as the transmission range increases, the received signal intensity of the data packet becomes weaker, until the data packet is routed by another node. Thus, it is implicit that the possibility of a transmission error increases as the transmission range of the data packet increases. Especially, since the link quality between a sending node and a node placed at the boundary of the transmission range of the sending node is low, the data packet transmitted to this node is likely to be lost.

As illustrated in FIG. 1, since node C is placed near the boundary 130 of the transmission range of node A, node A and node C are interconnected by a low quality link. Accordingly, the possibility of success of data packet transmission between node A and node C is low. That is, when the second path 120 is set as a routing path (according to the conventional art) so that node A may transmit a data packet to node F, transmission of the data packet may fail because of the low quality of the link between node A and node C. If transmission of the data packet fails, node A tries to re-transmit the data packet. However, unless the link quality between node A and node C is improved, the data packet transmission error may reoccur. Also, the more the data packet is re-transmitted, the more network resources are wasted.

Accordingly, to efficiently use network resources, the first path 110, which is a relatively stable link, is desirably set as the routing path even though traveling distance of the data packet is relatively longer than when the second path 120 is set as the routing path.

When node C, which is at the transmission boundary 130, broadcasts a control packet, the possibility that the control packet is successfully transmitted to node A is also low. Accordingly, the control packet transmitted from the node C may not be received by the node A for a time. As a result, the entry of node C may be frequently deleted from the neighbor table (regarding neighbor nodes of node A) and again registered in the neighbor table.

Therefore, nodes which ascertain the network topology through the neighbor table have unreliable knowledge of the network topology because of the low quality links.

Korean Unexamined Patent Publication No. 10-2004-0013744, entitled "Method, Apparatus and Data Structure for Synchronizing Link States in an Ad hoc Network", discloses a technique that is capable of quickly synchronizing link states without overhead, wherein each node broadcasts information on the state of a directly linked neighbor node, stores the link state information received from the neighbor node and then broadcasts it again to the neighbor node. Accordingly, the overhead resulting from broadcasting an entire routing table (that each node possesses) in order to ascertain the network topology can be reduced. Despite this technique, problems such as data packet transmission errors and an unstable network topology due to neighbor nodes having low link quality still occurs.

Accordingly, there is a need for a technique to provide a stable network topology and routing path.

SUMMARY OF THE INVENTION

An object of the present invention is to set a stable routing path under MANET environment.

Another object of the present invention is to provide a stable network topology under MENET environment.

The present invention is not limited to the object described above, and any other objects not described herein can be comprehended by those in the art from the following disclosure.

According to an exemplary embodiment of the present invention, there is provided a method for setting a routing path in mobile ad hoc environment, the method comprises, receiving a packet periodically broadcast from a neighbor node, measuring quality of a link with the neighbor node through the received packet, calculating routing paths by using routing information of the neighbor node in the case where the measured link quality is higher than a first threshold value, and setting a shortest routing path to a destination node, among the calculated routing paths, as a path for data packet transmission.

According to another exemplary embodiment of the present invention, there is provided method for managing a neighbor node in mobile ad hoc environment, the method comprises receiving a packet periodically broadcast from a neighbor node, measuring quality of a link with the neighbor node through the received packet, and managing the neighbor as a first node group or a second node group according to the measured link quality.

According to a further exemplary embodiment of the present invention, there is provided a network device comprising a transceiving unit which receives a packet periodically broadcast from a neighbor node, an measuring unit which measures quality of a link with the neighbor node through the transceiving unit, a comparison unit which compares the measured link quality with first threshold value, and a routing unit which calculates routing paths by using routing information of the neighbor node in the case where the link quality is higher than the first threshold value as a result of the comparison by the comparison unit and sets the routing path which has the shortest path to a destination node, among the calculated routing paths, as a path which will transmit data packet.

According to a still further exemplary embodiment of the present invention, there is provided a network apparatus comprising a transceiving unit which receives a packet periodically broadcast from a neighbor node, a measuring unit which measures quality of a link with the neighbor node through the received packet, and a management unit which manages the neighbor node as a first node group or a second node group according to the measured link quality

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
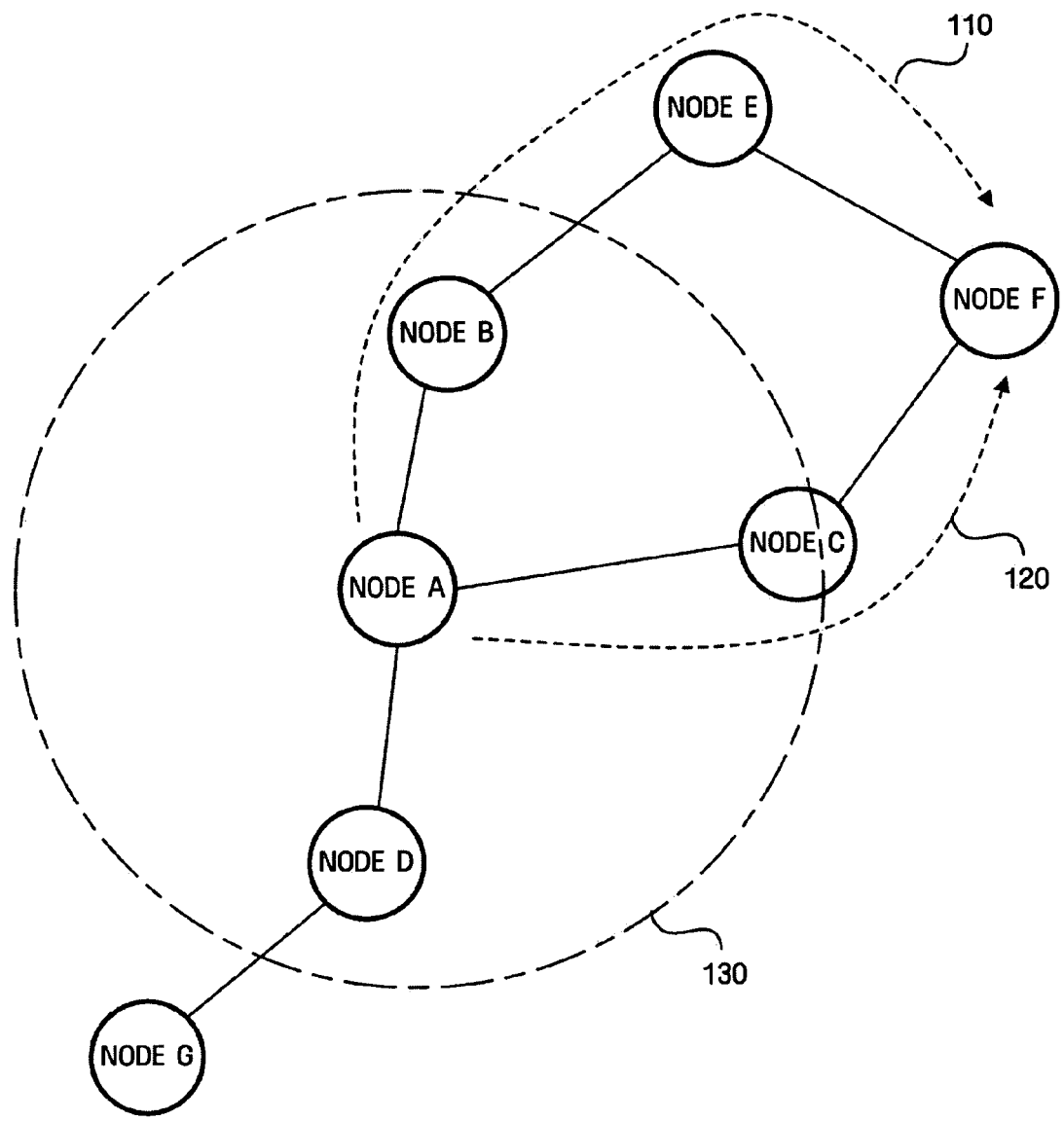
FIG. 1 illustrates a typical MANET topology.

Apparatuses and methods consistent with the present invention may be understood more readily by reference to the following detailed description of exemplary embodiments and accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the mentioned claims. Like reference numerals refer to like elements throughout the specification.

Hereinafter, exemplary embodiments of the present invention will be described in detail with reference to the accompanying drawings.

Figure 2:
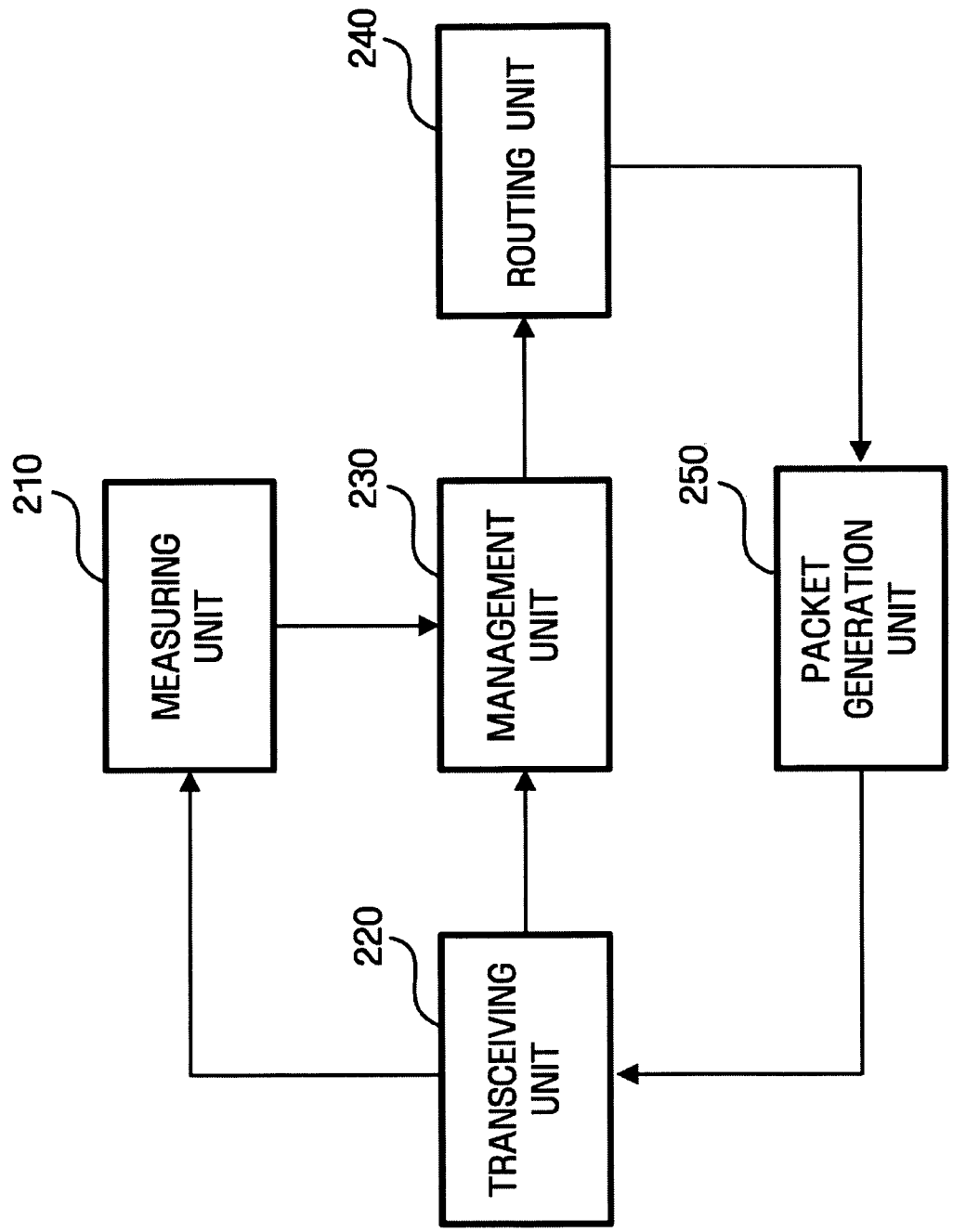
FIG. 2 is a block diagram schematically illustrating a network apparatus according to an exemplary embodiment of the present invention.

FIG. 2 is a block diagram roughly illustrating a network apparatus according to an exemplary embodiment of the present invention.

As illustrated, a network apparatus comprises a measuring unit 210, a transceiving unit 220, a management unit 230, a routing unit 240 and a packet generation unit 250.

The measuring unit 210 measures the quality of a link with a neighbor node. Link quality is a numerical value representing stability of a link with a neighbor node, which affects the packet transmission success rate. That is, the higher the link quality, the higher the packet transmission success rate. Likewise, the lower the link quality, the lower the packet transmission success rate. Link quality is decided by features such as the distance between a sending node and a neighbor node, the presence of an obstacle (for example, a structure such as a building or a landmark) between the sending node and the neighbor node, communication traffic in the wireless network, and other features known in the art.

The link quality can be represented by, for example, a signal to noise ratio (SNR). When the transceiving unit 220 receives a packet from a neighbor node, the measuring unit 210 may measure the received signal strength indication (RSSI) and calculate the Signal to Noise Ratio (SNR).

A packet used in measuring the link quality is periodically broadcast from a neighbor node, whereby the illustrated network apparatus may continuously measure the quality of a link with a neighbor node at regular intervals. The packet that is periodically broadcast from the neighbor node may be a control packet which contains routing information of the neighbor node. In the MANET routing protocol, a hello packet, used mainly in proactive mechanisms, is an example of the control packet.

The transceiving unit 220 is responsible for sending/receiving packets to/from a neighbor node through a wireless medium. When a packet is received from a neighbor node, the transceiving unit 220 outputs the received packet to the management unit 230. At this time, the packet output to the management unit 230 is the same as the packet used by the measuring unit 210 to measure the link quality.

Also, the transceiving unit 220 transmits the packet generated by the packet generation unit 250 to the neighbor node. When the packet generated by the packet generation unit 250 is a control packet, the control packet may be broadcast.

The management unit 230 groups the neighbor nodes which have sent packets according to the link quality measured by the measuring unit 210 in order to manage them. The management unit 230 will be described later in detail with reference to FIG. 3.

The routing unit 240 may ascertain the network topology through routing information of specific neighbor nodes managed by the management unit 230. The specific neighbor nodes refer to the neighbor nodes that belong to a first node group (to be described later). The routing unit 240 may calculate the routing path by using routing information of the neighbor nodes in the first node group.

Accordingly, when the packet generation unit 250 generates a data packet to be transmitted to another node, the routing unit 240 may select the shortest routing path to a destination node among the calculated routing paths, and set it as the path to transmit the data packet.

The routing unit 240 may also provide the packet generation unit 250 with routing information of the illustrated network apparatus. For instance, the routing unit 240 may generate a routing table which contains routing information of the illustrated network apparatus, and provide it to the packet generation unit 250.

The packet generation unit 250 generates a data packet that the illustrated network apparatus will transmit to another node. The packet generation unit 250 may also generate a control packet which will be broadcast to neighbor nodes. The control packet generated by the packet generation unit 250 may contain routing information of the illustrated network apparatus, and this routing information may be provided from the routing unit 240.

For example, the packet generation unit 250 may add the routing table generated by the routing unit 240 to the control packet as routing information. The control packet generated by the packet generation unit 250 is broadcast through the transceiving unit 220.

Figure 3:
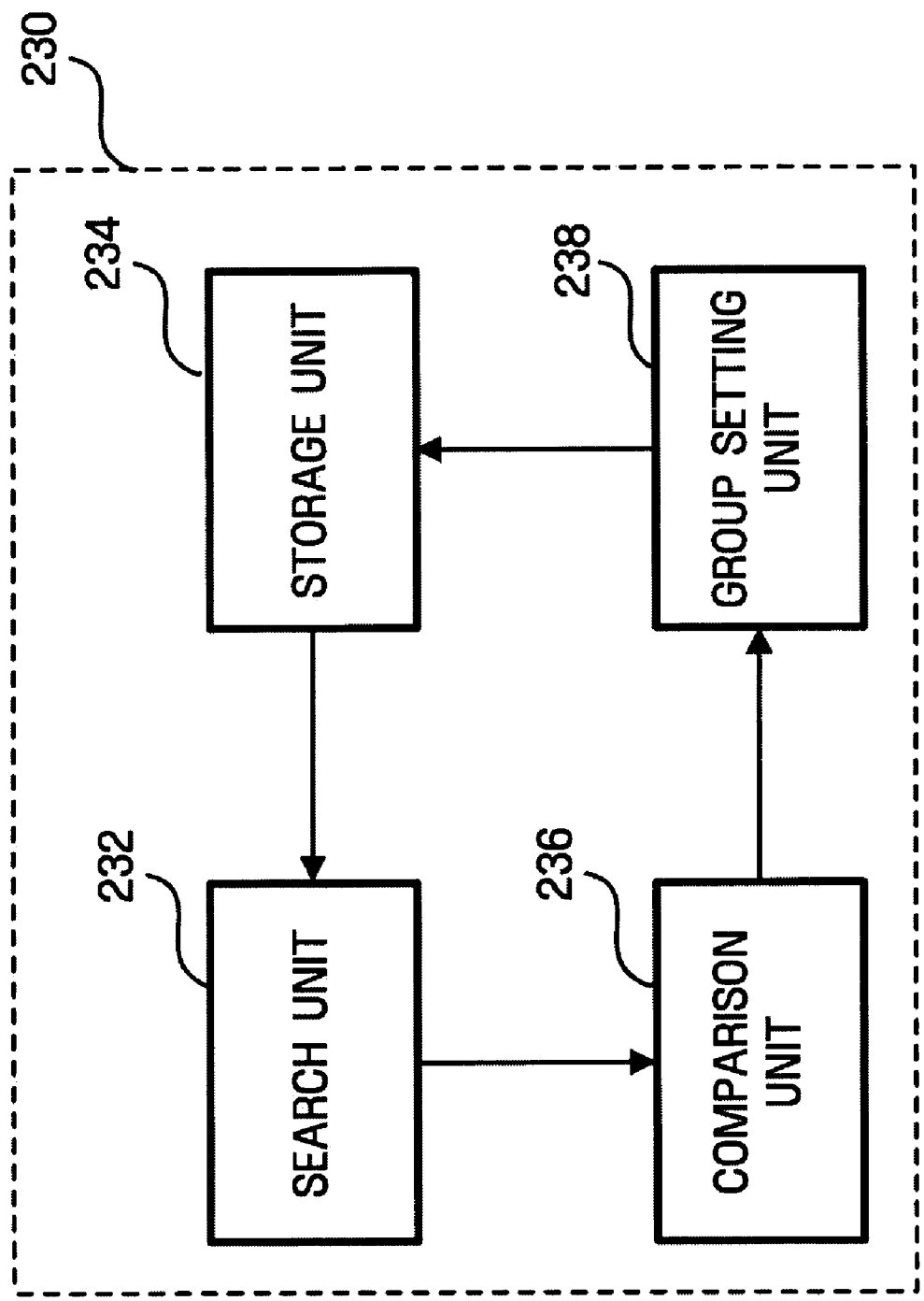
FIG. 3 is a block diagram illustrating the management unit of FIG. 2.

FIG. 3 is a block diagram illustrating the management unit 230 of FIG. 2.

As illustrated, the management unit 230 comprises a search unit 232, a storage unit 234, a comparison unit 236, and a group setting unit 238.

When a packet is input from the transceiving unit 220, the search unit 232 searches to find whether the neighbor node that has transmitted the packet belongs to a first node group or a second node group. For this search, a node identifier to identify a neighbor node may be used. The search unit 232 outputs the search result to the comparison unit 236.

The comparison unit 236 compares the link quality measured by the measuring unit 210 with a threshold value, and outputs the comparison result to the group setting unit 238. This threshold value could be a first threshold value or a second threshold value according to the search result from the search unit 232. It is advantageous that the first threshold value be higher than the second threshold value.

When the search unit 232 does not find the neighbor node in the first node group or the second node group, this implies that the neighbor node is a new node which has moved within wave arrival distance of the network apparatus illustrated in FIG. 2. In this case, the measured link quality of the concerned neighbor node may be compared with the first threshold value.

When the search unit 232 finds a neighbor node in the first node group, the measured link quality of the concerned neighbor node may be compared with the second threshold value.

Also, when the search unit 232 finds a neighbor node in the second node group, the measured link quality of the neighbor node may be compared with the first threshold value.

According to the result of the comparison by the comparison unit 236, the group setting unit 238 classifies the neighbor nodes into a first node group and a second node group, and stores information about the neighbor nodes in the storage unit 234 by group. The first node group may refer to a neighbor table described based on the conventional art MANET network topology. Accordingly, the first node group may comprise a node identifier to identify a neighbor node, and information to represent a state of a link with a neighbor node. Routing information of the neighbor nodes in the first node group may be used so that the routing unit 240 can calculate a routing path.

When a packet periodically broadcast from a neighbor node belonging to the first node group or the second group is not received after a threshold time period, the group setting unit 238 may delete the concerned neighbor node from the first node group or the second node group.

The storage unit 234 stores information about the neighbor node by node group classified by the group setting unit 238.

Figure 6:
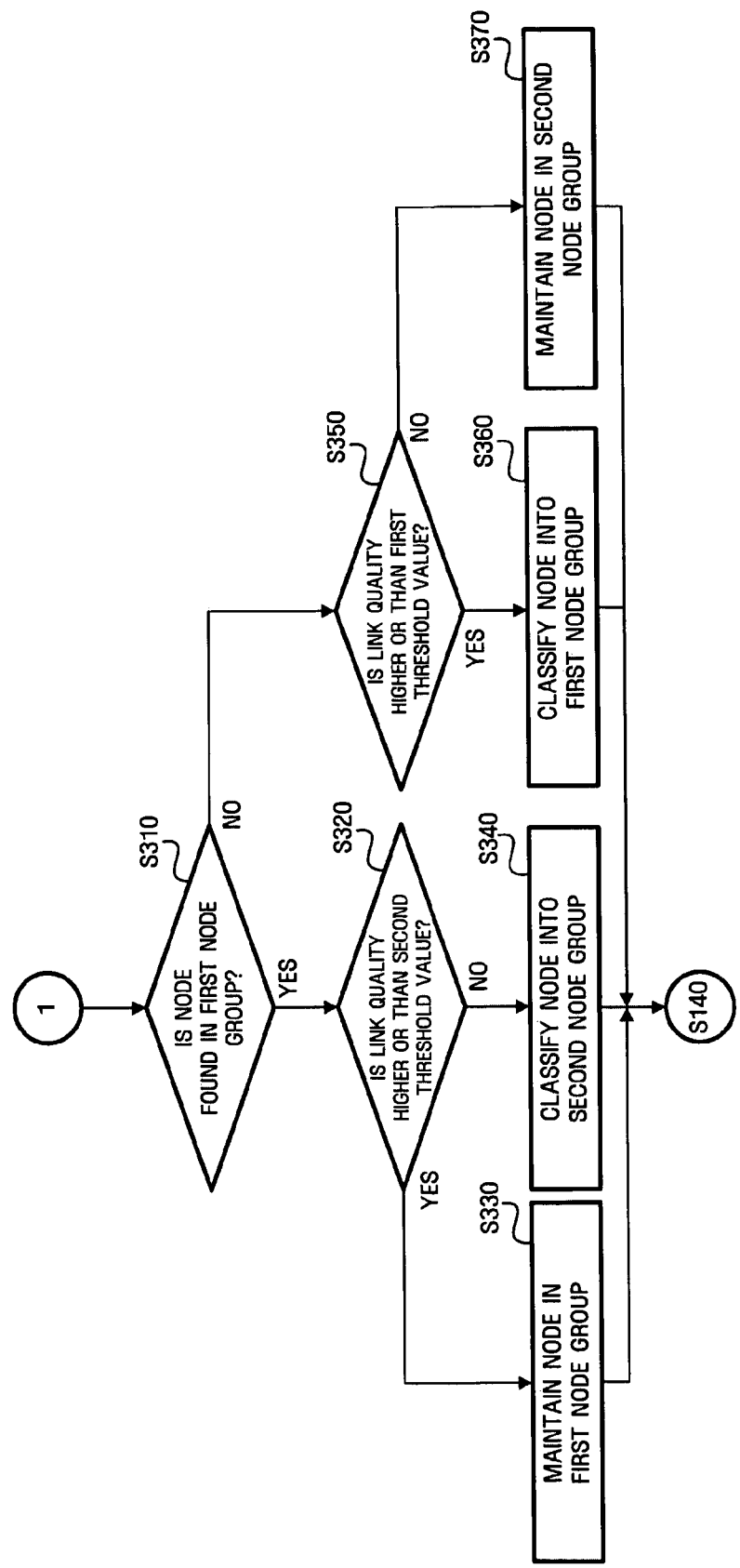

Hereinafter, operations of each technical block illustrated in FIGS. 2 and 3 will be described with reference to FIG. 4 and FIG. 6.

Figure 4:
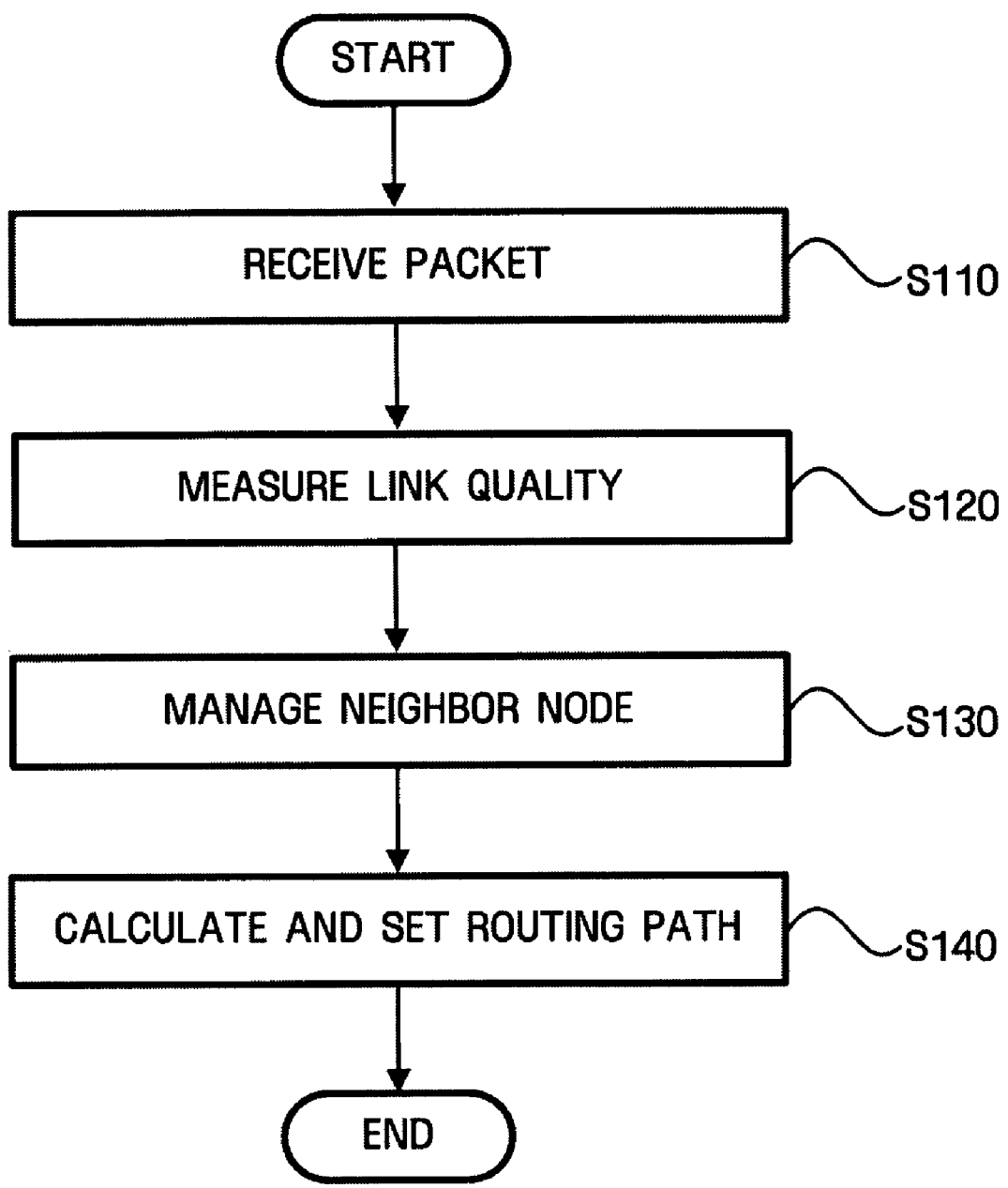
FIG. 4 is a flowchart illustrating the setting of a routing path according to an exemplary embodiment of the present invention.

FIG. 4 is a flowchart illustrating the setting of a routing path according to an exemplary embodiment of the present invention.

When the transceiving unit 220 receives a packet periodically broadcast from a neighbor node (operation S110), the measuring unit 210 measures the quality of the link with the neighbor node that has broadcast the packet (operation S120). A SNR may be used to indicate this link quality. And the packet used in measuring the link quality (i.e., the packet received in operation S110) may be a control packet containing routing information of the neighbor node.

The management unit 230 classifies the neighbor node into a first node group or a second node group, according to the measured link quality, and manages the neighbor node (operation S130). Operation S130 will be described in detail with reference to FIG. 5 and FIG. 6.

The routing unit 240 calculates routing paths using routing information of the neighbor nodes managed as the first node group by the management unit 230, selects the shortest routing path to the destination node, among the calculated routing paths, and sets it as the path for transmitting the data packet (operation S140).

Figure 5:
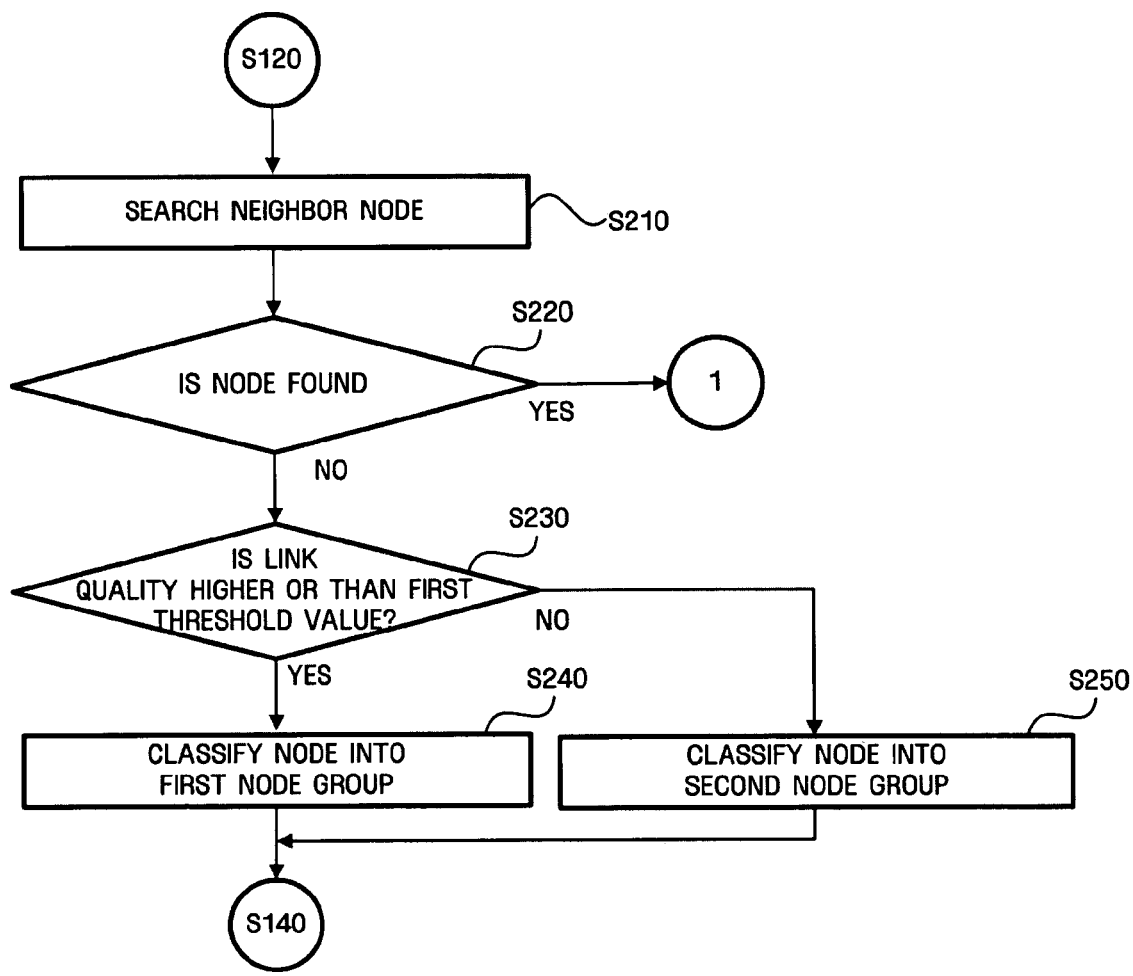
FIGS. 5 and 6 are a flowchart illustrating management of neighbor nodes according to an exemplary embodiment of the present invention.

FIG. 5 is a flowchart specifically illustrating operation S130 to manage the neighbor nodes of FIG. 4.

The search unit 232 searches for the neighbor node that transmitted the packet from a node group stored in the storage unit 234 (operation S210).

If the neighbor node that transmitted the packet is not found in either the first node group or the second node group (operation S220), the comparison unit 236 compares the measured link quality with a first threshold value (operation S230).

As a result of the comparison, when the link quality is higher than the first threshold value, the group setting unit 238 can classify the neighbor node into the first node group S240. However, when the link quality is lower than the first threshold value, the group setting unit 238 classifies the neighbor node into the second node group S250. In this case, routing information is used in operation S140 of FIG. 4; that is, the routing unit 240 calculates a routing path by referring to the routing information of the neighbor node whose link quality is higher than the first threshold value.

A case where the neighbor node is searched for in the first node group or the second node group by the search unit 232 will be described with reference to FIG. 6.

When the neighbor node that transmitted the packet is found in the first node group as a result of the search by the search unit 232 (operation S310), the comparison unit 236 compares the link quality measured by the measuring unit 210 with the second threshold value (operation S320).

As a result of the comparison, when the link quality is higher than the second threshold value, the group setting unit 238 maintains the neighbor node in the first node group (operation S330). However, the group setting unit 238 classifies the neighbor node into the second node group when the link quality is lower than the second threshold value (operation S340). At this time, information of the neighbor node that has been classified into the second node group is deleted from the first node group.

That is, if quality of link with neighbor node, already managed in the first node group, is higher or than the second threshold value, routing information of the neighbor node may be used to calculate a routing path by routing unit 240 in operation S140 of FIG. 4.

As a result of search by the search unit 232, when a neighbor node that transmitted a packet is found in a first node group in operation S310, this implies that the packet was received from a concerned neighbor node before operation S110 of FIG.4, and calculation of the link quality based on the received packet was already performed. Accordingly, the packet broadcast from the neighbor node is re-received in operation S110 of FIG. 4, and the link quality is re-measured based on the re-received packet in operation S120. The case where the neighbor node is searched for in the second node group ('NO' in operation S310) may be understood in the same manner.

When the neighbor node is found in the second node group by the search unit 232 ('NO' in operation S310), the comparison unit 236 compares the link quality measured by the measuring unit 210 with the first threshold value (operation S350).

When the link quality is higher than the first threshold value, the group setting unit 238 classifies the neighbor node into the first node group (operation S360). However, the group setting unit 238 maintains the neighbor node in the second node group when link quality is lower than the first threshold value (operation S370). That is, if quality of link with neighbor node, already managed in the second node group, is higher than the first threshold value, routing information of the neighbor node may be used to calculate a routing path by routing unit 240 in operation S140 of FIG. 4.

According to another exemplary embodiment of the present invention, the management unit 230 may not separately manage information on the neighbor node classified into the second node group in the above-described exemplary embodiment. In this case, the search operation of operation S220 of FIG. 5 is performed on the first node group. Also, operation S340 of FIG. 6 may be replaced with an operation deleting the neighbor node from the first node group, and operations S350 to S370 may be omitted.

When a packet periodically broadcast from a neighbor node that belongs to the first node group or the second node group has not been received during a certain time period, an operation for the group setting unit 238 to delete a concerned neighbor node from the first node group or the second node group may be added.

Figure 7:
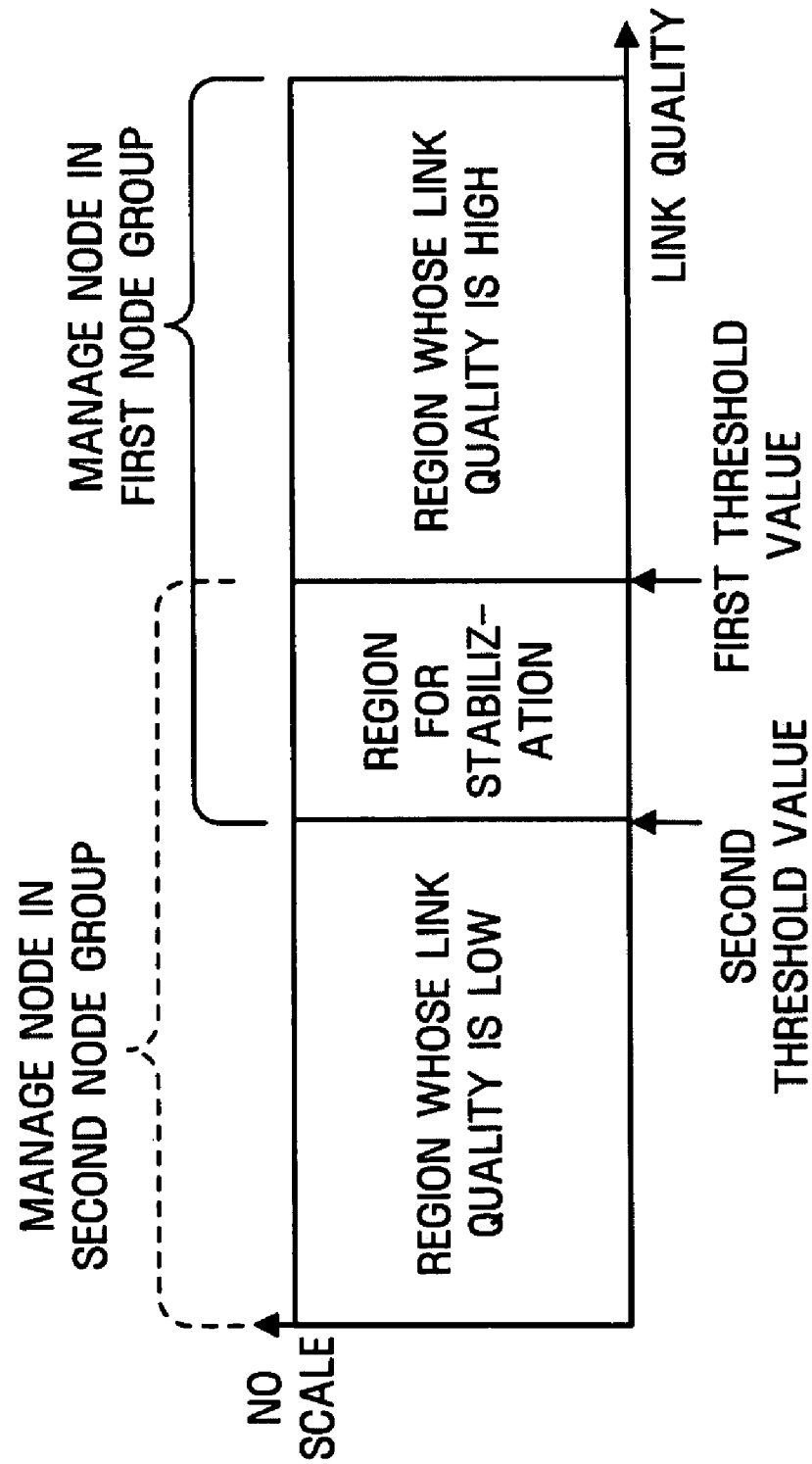
FIG. 7 illustrates link level qualities, on which basis node groups are classified according to an exemplary embodiment of the present invention.

Node groups are classified on the basis of link quality levels, which are shown in FIG. 7, according to an exemplary embodiment of the present invention.

As described above, the quality of a link with a new neighbor node is compared with the first threshold value when a control packet is transmitted from the new neighbor node. At this time, the new neighbor node whose link quality is higher than the first threshold value is classified into the first node group and routing information of the concerned node is used to calculate a routing path.

Although the quality of link with a neighbor node managed in the first node group becomes lower than the first threshold value, the neighbor nodes will be continually managed in the first node group when the link quality is higher than the second threshold value.

Accordingly, since routing information of the neighbor node is linked with the link quality, whose numerical value is higher than a quality level, and is used as data for calculating a routing path, the success rate of transmitting a data packet can increase.

Also, the degree of change in connection with a configuration of the first node group is lowered since a dual threshold value (the first threshold value and the second threshold value) is applied in order to manage the neighbor node in the first node group, a stable network topology can be provided.

Figure 8:
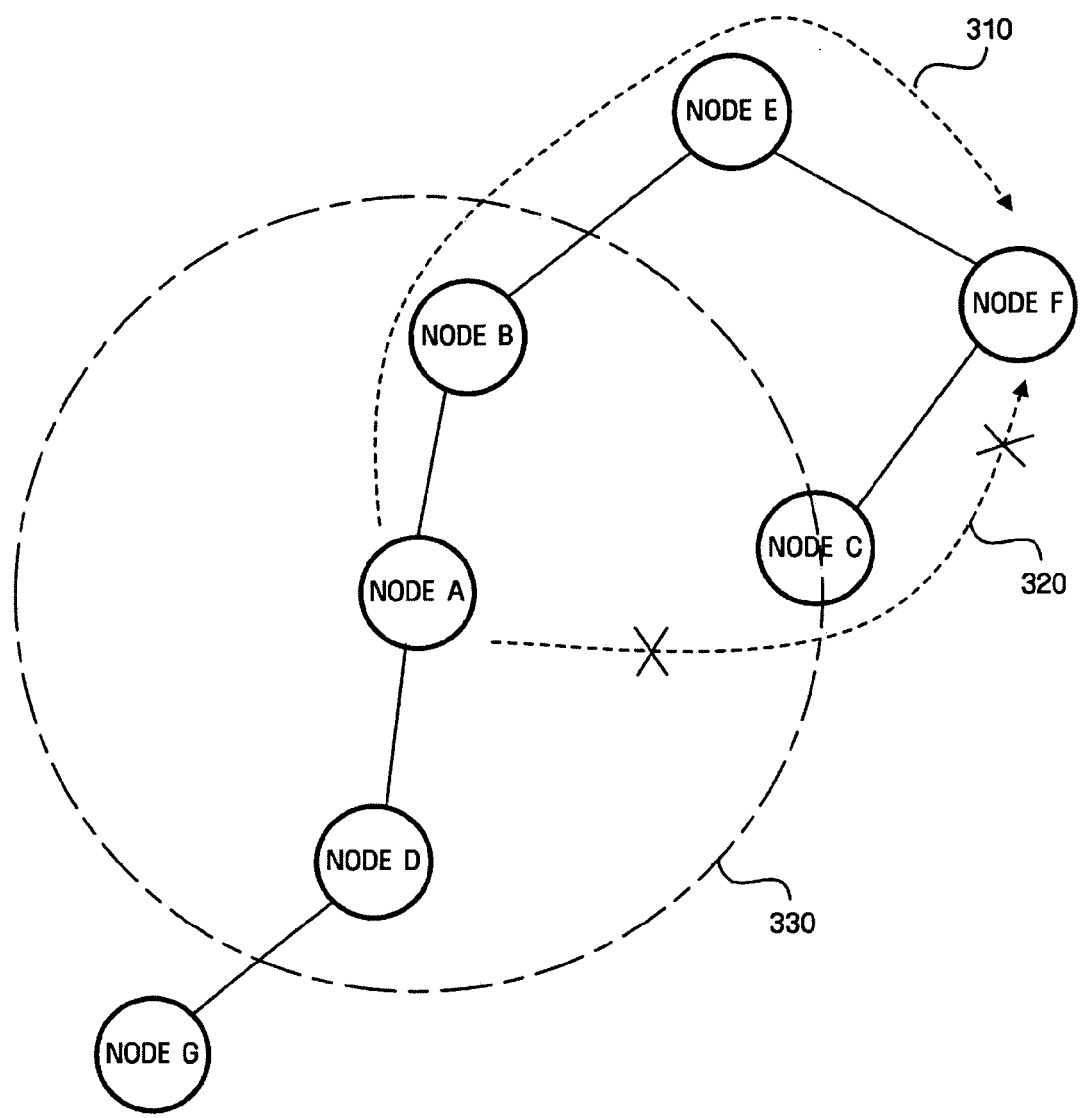
FIG. 8 illustrates a network topology according to an exemplary embodiment of the present invention.

FIG. 8 illustrates a network topology according to an exemplary embodiment of the present invention.

Nodes illustrated in FIG. 8 have the same positions as the nodes illustrated in FIG. 1. In this figure, a node C is placed near a transmission boundary 330, and accordingly, it is assumed that the link quality between a node A and node C is lower than the first threshold value.

Node A received control packet of node C, and manages the node C in the second node group because quality of a link with the node C is lower than the first threshold value.

In this case, the link between node A and node C is not reflected in the network topology managed by node A and routing information is not used as data for the node A to calculate a routing path.

Accordingly, when node A transmits a data packet to a node F, a second path 320 via node C is not considered when node A calculates the routing path. Finally, a first path 310 is chosen as the routing path when node A transmits a data packet to node F.

In short, any path with a quality lower than a threshold level is not set as a routing path, even if the path is relatively short.

As described above, a method for managing a neighbor node and setting a routing path in mobile ad hoc network environment and a network device using the same may produce one or both of the following effects.

First, a stable routing path may be set in a MANET environment.

Second, the stability of the MANET topology may be improved.

While exemplary embodiments of the present invention have been particularly shown and described with reference to the accompanying drawings, it will be understood by those skilled in,the art that various changes in form and details may be made therein without departing from the spirit and scope of the invention as defined by the appended claims. The exemplary embodiments should be considered in a descriptive sense only and not for purposes of limitation.

What is claimed is:

1. A method for managing a neighbor node in a mobile ad hoc network environment, comprising: receiving a packet that is periodically broadcast from a neighbor node; measuring quality of a link with the neighbor node through the received packet; and managing the neighbor node in a first node group or a second node group according to the measured link quality; comparing the measured link quality with a second threshold value when, as a result of searching, the neighbor node is found in the first node group; maintaining the neighbor node in the first node group when the link quality is found to be higher than the second threshold value; and classifying the neighbor node into the second node group when, as a result of the comparison with the second threshold value, the link quality is found to be lower than the second threshold value, wherein managing the neighbor node comprises: searching for the neighbor node in the first node group; comparing the measured link quality with a first threshold value when the neighbor node is not found during the search; classifying the neighbor node into the first node group when the link quality is higher than the first threshold value; and classifying the neighbor node into the second node group when the ling quality is lower than the first threshold value.

2. The method of claim 1, wherein the packet comprises routing information of the neighbor node.

3. The method of claim 2, wherein the routing information of the neighbor node managed in the first node group is used in calculating a routing path.

4. The method of claim 1, wherein the link quality is a SNR value based on a signal strength of the received packet.

5. The method of claim 1, further comprising deleting the neighbor node from the first node group or the second node group when a packet is not received from the neighbor node managed by the first node group or the second node group during a certain time period.

6. A network apparatus comprising: a transceiving unit which is configured to receive a packet periodically broadcast from a neighboring node; a measuring unit which is configured to measure quality of a link with the neighbor node based on the received packet; and a management unit which is configured to manage the neighbor node in a first node group or a second node group according to the measured link quality, wherein the threshold value becomes a first threshold value when the neighbor node is not found in the first node group as a result of the search by the search unit; when, as a result of comparison by the comparison unit, the link quality is found to be higher than the first threshold value, the group setting unit classifies the neighbor node into the the first node group, and when the link quality is lower than the first threshold value, the group setting unit classifies the neighbor node into the second node group, and wherein the measurement unit comprises: a search unit which is configured to search for the neighbor node in a first node group; a comparison unit which is configured to compare the link quality of the neighbor node with a threshold value according to a result of the search by the search unit; and a group setting unit which is configured to classify the neighbor node into the first node group or the second node group according to the result of the comparison by the comparison unit.

7. The apparatus of claim 6, wherein the packet includes routing information of the neighbor node.

8. The apparatus of claim 6, wherein the link quality is a SNR value based on a signal strength of the received packet.

9. The apparatus of claim 6, wherein the threshold value becomes a second threshold value when the neighbor node is found in the first node group as a result of the search by the search unit, and when, as a result of comparison by the comparison unit, the link quality is found to be higher than the second threshold value, the group setting unit maintains the neighbor node in the first node group, and when the link quality is lower than the second threshold value, the group setting unit classifies the neighbor node into the first node group.

10. The apparatus of claim 6, wherein routing information of the neighbor node classified into the first node group is used in calculating a routing path.

11. The apparatus of claim 6, wherein the group setting unit deletes the neighbor node managed in the first node group or the second node group from the first node group or the second node group when a packet is not received from the neighbor node during a certain time period.

* * * * *